P., E. W. & J. A. Blake,
Door Fastening.

N° 3,017.　　　　　Patented Mar. 21, 1843.

UNITED STATES PATENT OFFICE.

PHILOS BLAKE, ELI W. BLAKE, AND JOHN A. BLAKE, OF NEW HAVEN, CONNECTICUT.

PLATE TURN-BUTTON FOR FASTENING CUPBOARD AND OTHER DOORS.

Specification of Letters Patent No. 3,017, dated March 21, 1843; Antedated February 27, 1843.

*To all whom it may concern:*

Be it known that we, PHILOS BLAKE, ELI W. BLAKE, and JOHN A. BLAKE, of New Haven, in the county of New Haven and State of Connecticut, have invented a new and useful Improvement in Common Plate-Buttons for Cupboard and other Doors, sometimes called the "Turn-Button"; and we do hereby declare that the following is a full and exact description.

The object of our improvement is, to prevent the button from turning too freely on the plate; and it consists in the employment of a spring to make friction on the plate for that purpose.

It is well known to those who have observed the use of the common turn button, that much inconvenience in the use, and much injury to the door results from the too great freedom of movement which it soon acquires, however hardly it may move at first. Our friction spring is a permanent remedy of this evil.

Figure 1:
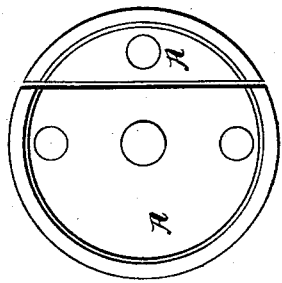
Figure 2:
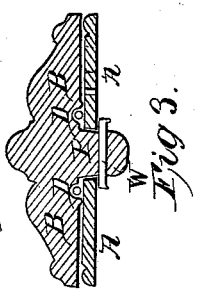
Figure 3:
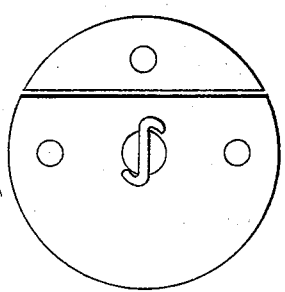
Figure 4:
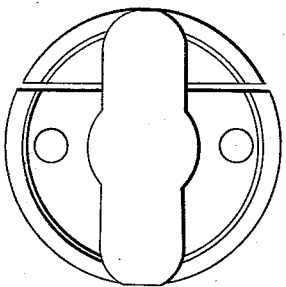

Figure 1 is a view of the plate in both its parts A, A. Fig. 2 is a section showing the plate at A, A, the button B, B, and its pivot P. W is a pin or wire passed through the pivot beneath the plate to secure the button and plate together. The ends of this pin are either battered down to keep it from dropping out, as shown in this figure, or they may be bent around against the pivot as shown in Fig. 3. Fig. 3 is a view of the underside of the plate, showing also a section of the pivot and of the pin with its ends bent around as described. Fig. 4 shows the outline of the base of the button over the plate.

The friction spring may be applied in various ways. The cheapest and best way known to us is as follows: We make a circular cavity or depression in the underside of the button around the pivot and concentric with it, as shown in section at D, D, Fig. 2; which cavity is of sufficient depth to remove a single coil or ring of wire; which ring is also shown in section within the cavity in the same figure. Having formed this coil or ring, we give it a bend laterally, so as to throw its plane or disk into a slight curve. Being then placed in the cavity and the button and plate being secured together, it constitutes the friction spring, and will bear upon two opposite points on the plate, and upon two opposite and intermediate points on the button, and will thus produce a sufficient degree of friction to cause the button to retain any position in which it may be placed.

This improvement is equally applicable and in the same manner to all plate turn buttons, whether constructed in other respects in the particular manner represented in the drawings annexed or in any of the modes heretofore in use.

What we claim as our improvement in the plate turn button above described, and wish to secure by Letters Patent, is—

The employment of a spring in combination with the other parts of a plate turn button, to make friction on the plate, and thereby to prevent the button from turning too freely, as herein set forth.

And we do hereby expressly disclaim every thing described, named, or referred to herein except the particular above specified.

PHILOS BLAKE.
ELI W. BLAKE.
JOHN A. BLAKE.

Witnesses:
SHERMAN TYLER,
CHESTER WARNER.